Dec. 8, 1936.  D. F. SEARLE  2,063,700
AIR BRAKE CONTROL VALVE
Filed Jan. 2, 1935   2 Sheets-Sheet 1

INVENTOR:
DUDLEY F. SEARLE
BY
ATTORNEY

Dec. 8, 1936.  D. F. SEARLE  2,063,700
AIR BRAKE CONTROL VALVE
Filed Jan. 2, 1935  2 Sheets-Sheet 2

INVENTOR:
DUDLEY F. SEARLE.
BY
ATTORNEY

Patented Dec. 8, 1936

2,063,700

UNITED STATES PATENT OFFICE 2,063,700

AIR BRAKE CONTROL VALVE

Dudley F. Searle, Oakland, Calif.

Application January 2, 1935, Serial No. 63

3 Claims. (Cl. 294—54)

This invention relates to improvements in air brake control valves and more particularly to control valves for vacuum power "booster" brakes.

Among the objects of this invention is to facilitate smooth application of the brakes.

Another object is to increase the sensitivity of the brake control.

Another object is to render a single disk type control valve capable of having both its atmospheric and vacuum power ports closed to the brake power chamber.

Another object is to provide a valve at minimum expense that is permanently reliable in operation.

Other objects and advantages appear as this description progresses.

In this specification and the accompanying drawings, the invention is disclosed in its preferred form. It is, however, to be understood that it is not limited to this specific form because it may be embodied in other forms within the spirit of the invention as defined by the claims following the descrtiption.

Figure 2:
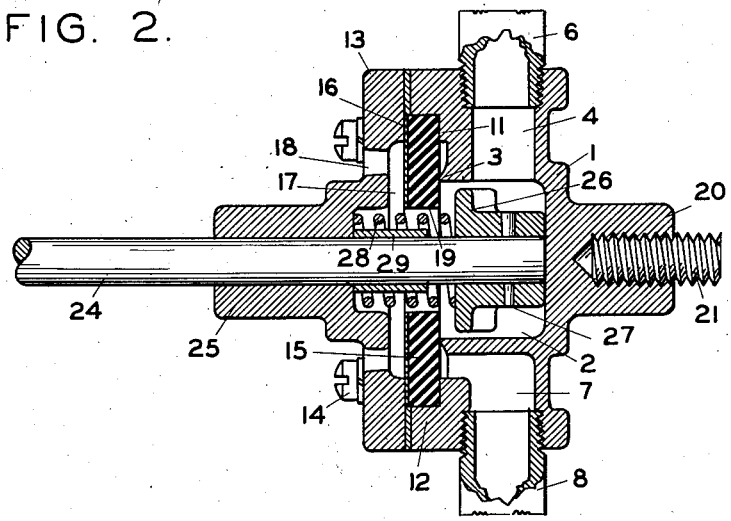
Fig. 2 is a longitudinal section of the control valve in inoperative position with the atmospheric port open to the brake power chamber.

In detail the construction illustrated in the drawings, referring more particularly to Fig. 2, comprises the valve body 1 having the central recess 2 surrounded by the annular valve seat 3. The port 4 communicates with the recess 2 and has the elbow pipe joint 6 screwed thereinto which leads off to the brake power chamber. The port 7 opens to the interior of the body 1 but is separated from the recess 2 by the valve seat 3. The elbow 8 is screwed into the passage 7 and is connected by the flexible hose 9 to a suitable source of subatmospheric air pressure such as the intake manifold 10 of an internal combustion engine.

The body 1 has the annular shoulder 11 surrounded by the flange 12. The cover 13 is secured to the flange 12 by the screws 14. The resilient valve disk 15 has its perimeter clamped between the cover 13 and the annular shoulder 11.

Figure 3:
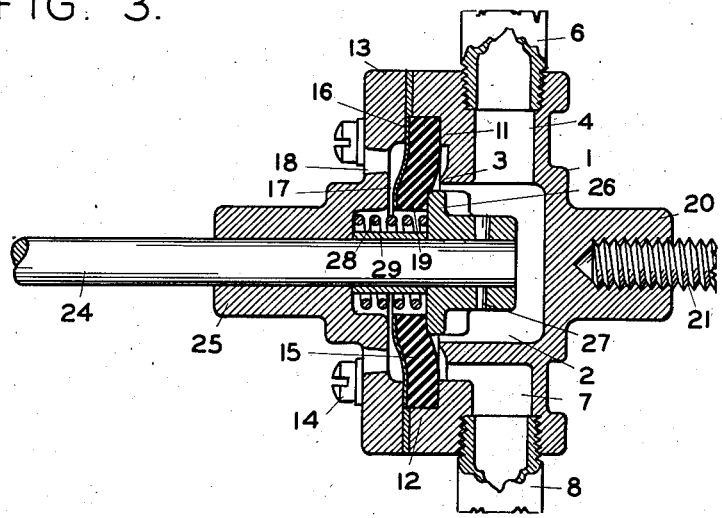
Fig. 3 is a similar view of the same with the vacuum suction port open.
Figure 4:
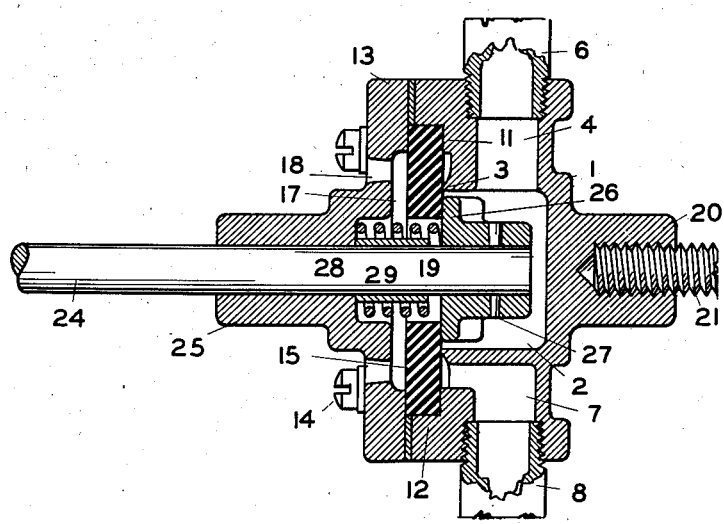
Fig. 4 is a similar view of the same with a slightly modified valve disk with both atmospheric and suction ports closed.

The valve disk may be fabricated of rubber vulcanized on to the thin spring metal plate 16 as in Fig. 2 and Fig. 3 or it may be formed of plain rubber as in Fig. 4. When the valve is in the inoperative position the valve disk 15 firmly seats itself at 3 by its own resiliency. The suction port 7 is thus cut off from communication with the power chamber port 4.

The cover 13 is recessed at 17 opposite the valve disk 15 and has the atmospheric ports 18 therethrough. The valve disk has the central opening 19. When the valve is in the inoperative position as in Fig. 2, the atmospheric ports 18 communicate with the power chamber port 4 through the opening 19.

Figure 1:
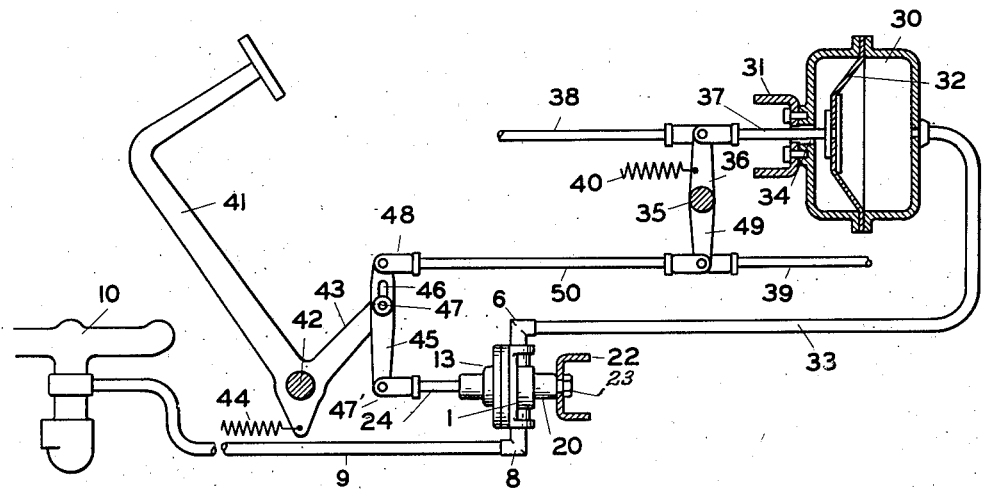
Fig. 1 is a diagrammatic side elevation showing a control valve constructed in accordance with this invention installed in a suction power booster brake system.

The valve body 1 has the lug 20 with the threaded shank 21 screwed thereinto which is adapted to be attached to a suitable cross member or bracket 22, see Fig. 1, by the nut 23 to mount the valve. The valve stem 24 extends through the boss 25 on the cover 13 and is slidable therein and passes through the opening 19 in the valve disk 15. The plunger head 26 is fixed on the end of the stem 24 by means of the taper pin 27 and is adapted to engage and operate the valve disk 15. The spring 28 encircles the stem 24 and expands between the cover 13 and the plunger 26 to normally urge the plunger away from the valve disk 15 toward the bottom of the recess 2. The sleeve 29 on the stem 24 limits the movement of the plunger 26 toward the cover 13.

The power brake installation may be any one of the several types commercially available. In the present instance it includes the brake power chamber 30, see Fig. 1, mounted on the cross member 31 and divided into two compartments by the flexible diaphragm 32 therein. The hose 33 is connected to one side of the chamber 30 and leads off to the elbow joint 6 of the control valve. The opposite side of the chamber uninterruptedly communicates with the atmosphere through the port 34. The cross shaft 35 has the lever 36 thereon intermediate its length connected to the diaphragm 32 by the rod 37. The cross shaft has vertical levers at each end, to the top and bottom of which are connected the brake pull rods 38 and 39 which operate the brakes on the front and rear wheels respectively. The spring 40 normally maintains the brakes released and draws the diaphragm 32 toward the atmospheric port 34.

The conventional brake pedal 41 is mounted on the usual shaft 42 and has the arm 43 projecting therefrom. The spring 44 urges the brake pedal into inoperative position. The floating lever 45 has the longitudinal slot 46 therein which engages the pin 47 on the arm 43. The clevis 47' is mounted on the end of the valve stem 24 and is connected to the bottom of the lever 45. A similar clevis 48 pivots on the top of the lever 45 and is operatively connected to the lever arm 49 depending from the cross shaft 35 by the link 50.

The apparatus operates substantially as follows: Operation of the pedal 41 moves the pin 47 laterally. The operative movement of the brake system checks the movement of the link 50. The floating lever 45 accordingly pivots on the clevis 48 and pulls the valve stem 24. The movement of the stem 24 engages the plunger 26 against the valve disk 15 and closes the opening 19 therethrough. This cuts off the port 4 leading to the power chamber through the hose 33 from communication with the atmosphere.

The continued movement of the plunger pushes the resilient valve disk 15 into the recess 17 away from the seat 3 as shown in Fig. 3. The valve disk 15 is not freely flexible but is of moderate resiliency so that the force exerted by the plunger 26 at the center of the disk will move the body of the disk sufficiently to disengage it from the seat 3. The sleeve 29 limits further movement of the plunger 26 and obviates pinching the rubber disk 15 against the cover 13. Communication is thus provided between the ports 7 and 4 past the valve seat 3.

The subatmospheric pressure in the intake 10 of the internal combustion engine then partially evacuates the power chamber 30 through the hose 33, the ports 4 and 7 and the hose 9. The atmospheric pressure reacting against the opposite side of the diaphragm 32 in the power chamber urges the diaphragm toward the partially evacuated compartment. This retracts the rod 37 and the lever 36 to partially rotate the cross shaft 35. The rods 38 and 39 are thus drawn up to progressively apply the vehicle brakes.

The partial rotation of the cross shaft 35 swings the lever arm 49 and advances the link 50 toward the floating lever 45. This swings the floating lever on the pin 47 and moves the valve stem 24 and the plunger 26 thereon laterally toward the bottom of the recess 2. The inherent elasticity of the valve disk 15 causes it to accompany the movement of the plunger 24. The disk 15 is sufficiently flexible so that the atmospheric pressure against its side opposite the seat 3 will cause the portion intermediate its margin and the plunger 23 to yield and bulge toward the seat 3 until it firmly engages it. The plunger 26 is still in engagement with the disk and holding the opening 19 closed, as in Fig. 4.

When this occurs the power chamber port 4 is cut off from both the suction port 7 and the atmospheric ports 18. This stabilizes the air pressure in the chamber 30. The tension of the spring 40 and the mechanical resistance of the brake system then balances the operative effect of the subatmospheric pressure in the chamber 30. The brakes may be held continuously applied to the extent desired for a prolonged period without variation in the braking effect.

This is an important feature of the present invention. In prior single disk control valves it was impossible to maintain both the vacuum and the atmospheric ports continuously closed to the power chamber. Thus when the brakes were partially applied, the pressure in the power chamber was necessarily being either raised or lowered with consequent variations in the braking effect.

The operation of the valve as thus described renders it largely self balancing since as the fluid pressure differential on the two sides of the disk 15 increases, the disk yields and bulges intermediate its margins and the plunger 23. This seats the disk at 3 without appreciable reactionary movement of stem 24. This is important, as when the brakes near full application great variations of braking pressure are possible with very slight movement of the linkage mechanism.

When the valve is in the position shown in Fig. 4 with both the suction port 7 and the atmospheric ports 18 closed, the brakes can be still further applied by further pressure on the pedal 41. The link 50 being held stationary by the resistance of the brake system, the lateral movement of the pin 47 causes the floating lever 45 to pivot on the clevis 48 and operatively pull the stem 24. The plunger 26 then again unseats the valve disk 15 as shown in Fig. 3. The motor intake 10 then further evacuates the power chamber 30 through the uncovered port 7 thus further applying the brakes. In this manner an extremely sensitive control of the application of the brakes is secured, regulated by the pressure on the pedal 41. Release of the pedal 41 swings the floating lever 45 on the clevis 48 and pushes the valve stem 24 inward until the plunger abuts the bottom of the recess 2. The spring 28 expedites this movement of the plunger. The opening 19 being left uncovered, as in Fig. 2, air flows through the ports 18, the opening 19, and the port 4 to restore atmospheric pressure in the power chamber 30. The spring 40 then restores the brake system to the inoperative condition.

Having thus described this invention, what is claimed and desired to be secured by Letters Patent is:

1. An air brake system including a control valve comprising a body; a resilient disk having its margins confined in said body and having a central opening therethrough; a stem extending into said body; a plunger head on said stem and adapted to engage said disk and close said opening therethrough; said body having an annular valve seat therein surrounding said plunger and adapted to be engaged by said disk; said body also having ports inside and outside the circumference of said seat and adapted to communicate with a power chamber and a source of sub-atmospheric air pressure respectively; the side of said disk opposite to said seat and plunger being exposed to atmospheric pressure at all times; said plunger being adapted to displace said disk from said seat.

2. An air brake system including a control valve comprising a body having a recess therein; a resilient disk having its margins confined in said body and having a central opening therethrough; a movable operating stem extending into said body; a plunger head on said stem and adapted to engage said disk and close said opening therethrough; said body having an annular valve seat therein surrounding said plunger and adapted to be engaged by said disk; said body also having ports inside and outside the circumference of said seat and adapted to communicate with a power chamber and a source of subatmospheric air pressure respectively; the side of said disk opposite to said seat and plunger being exposed to atmospheric pressure at all times; said disk being relatively stiff so that the movements of said plunger will displace the body of said disk sufficiently to disengage the disk from said seat; and resilient means urging said plunger toward the inoperative position.

3. An air brake system including a control valve comprising a body having a recess therein; a resilient disk having its margins confined in said body and having a central opening therethrough; a movable operating stem extending into said body; a plunger head on said stem and adapted to engage said disk and close said opening therethrough; said body having an annular valve seat therein surrounding said plunger and adapted to be engaged by said disk; said body also having ports inside and outside the circumference of said seat and adapted to communicate with a power chamber and a source of sub-atmospheric air pressure respectively; the side of said disk opposite to said seat being exposed to atmospheric pressure at all times; said plunger being adapted to displace said disk from said seat; the resiliency of said disk permitting it to yield under the atmospheric pressure exerted thereagainst when the fluid pressure differential on its opposite sides becomes sufficiently great.

DUDLEY F. SEARLE.